United States Patent
Lee

(10) Patent No.: US 9,904,448 B2
(45) Date of Patent: *Feb. 27, 2018

(54) METHOD AND MOBILE COMMUNICATION TERMINAL FOR CHANGING A CONFIGURATION OF A SCREEN DISPLAYING FUNCTION ITEMS

(75) Inventor: Dong-Kook Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

This patent is subject to a terminal disclaimer.

(21) Appl. No.: 11/835,673

(22) Filed: Aug. 8, 2007

(65) Prior Publication Data

US 2008/0040680 A1    Feb. 14, 2008

(30) Foreign Application Priority Data

Aug. 8, 2006  (KR) ................ 10-2006-0074757

(51) Int. Cl.
 *G06F 3/0484* (2013.01)
 *G06F 3/0481* (2013.01)
 *G06F 3/0482* (2013.01)
 *H04M 1/725* (2006.01)

(52) U.S. Cl.
 CPC ........ *G06F 3/04847* (2013.01); *G06F 3/0482* (2013.01); *G06F 3/04815* (2013.01); *G06F 3/04817* (2013.01); *G06F 3/04842* (2013.01); *G06F 3/04845* (2013.01); *H04M 1/72583* (2013.01); *G06F 2203/04806* (2013.01); *H04M 1/72544* (2013.01); *H04M 1/72563* (2013.01); *H04M 1/72586* (2013.01)

(58) Field of Classification Search
 CPC ............ G06F 3/04817; G06F 3/04842; G06F 3/04845; G06F 3/04847; G06F 2203/04806
 USPC ......... 715/764, 810, 835; 455/566; 345/173; 340/815.4
 See application file for complete search history.

(56) References Cited

U.S. PATENT DOCUMENTS 5,838,317 A * 11/1998 Bolnick et al. ............... 715/764
6,366,263 B1  4/2002 Takasu et al.
6,405,224 B1 * 6/2002 Van Der Meer ........ G06F 17/24
                                                707/E17.112
(Continued)

FOREIGN PATENT DOCUMENTS

CN       1811899        8/2006
EP       1 207 449      5/2002
(Continued)

OTHER PUBLICATIONS

Brian Apps, "Sizer v3.3," Jul. 3, 2005, Available https://web.archive.org/web/20050703083148/http://www.brianapps.net/sizer.html.*

(Continued)

*Primary Examiner* — Alvin Tan
(74) *Attorney, Agent, or Firm* — Sughrue Mion, PLLC

(57) ABSTRACT

A function for configuring a screen reflecting user preference is implemented when formlets are displayed to indicate function items of a mobile communication terminal. The size, position and shape of a formlet on which an indicator is positioned are changed by user settings in a state in which multiple formlets are displayed, thereby increasing accessibility to a formlet of high preference to a user and also increasing display visibility.

12 Claims, 4 Drawing Sheets

(56) References Cited

U.S. PATENT DOCUMENTS

| | | | |
|---|---|---|---|
| 6,477,117 B1* | 11/2002 | Narayanaswami | G04G 13/026 368/224 |
| 6,484,189 B1* | 11/2002 | Gerlach, Jr. | G06F 8/34 715/201 |
| 6,501,487 B1 | 12/2002 | Taguchi | |
| 6,668,177 B2* | 12/2003 | Salmimaa et al. | 455/566 |
| 7,581,192 B2 | 8/2009 | Stabb et al. | |
| 7,587,683 B2* | 9/2009 | Ito et al. | 715/823 |
| 7,600,192 B1* | 10/2009 | Hashimoto et al. | 715/802 |
| 7,630,580 B1* | 12/2009 | Repenning | 382/285 |
| 7,631,274 B2* | 12/2009 | Kumagai et al. | 715/815 |
| 8,375,333 B2* | 2/2013 | Kang et al. | 715/838 |
| 8,464,177 B2 | 6/2013 | Ben-Yoseph et al. | |
| 2002/0033837 A1 | 3/2002 | Munro | |
| 2002/0160817 A1* | 10/2002 | Salmimaa et al. | 455/566 |
| 2003/0069874 A1 | 4/2003 | Hertzog et al. | |
| 2003/0222923 A1 | 12/2003 | Li | |
| 2004/0036682 A1 | 2/2004 | Zobuchi | |
| 2004/0210847 A1 | 10/2004 | Berson et al. | |
| 2005/0050474 A1* | 3/2005 | Bells et al. | 715/747 |
| 2005/0071775 A1 | 3/2005 | Kaneko | |
| 2005/0114796 A1* | 5/2005 | Bast | 715/856 |
| 2005/0240878 A1* | 10/2005 | Anthony et al. | 715/765 |
| 2006/0085434 A1 | 4/2006 | Mah et al. | |
| 2006/0123360 A1* | 6/2006 | Anwar et al. | 715/810 |
| 2006/0143574 A1 | 6/2006 | Ito et al. | |
| 2006/0274038 A1* | 12/2006 | Redkov et al. | 345/157 |
| 2007/0032899 A1 | 2/2007 | Mizuno et al. | |
| 2007/0213099 A1* | 9/2007 | Bast | 455/566 |
| 2008/0207188 A1* | 8/2008 | Ahn et al. | 455/418 |
| 2011/0066976 A1* | 3/2011 | Hwang | 715/810 |

FOREIGN PATENT DOCUMENTS

| | | | |
|---|---|---|---|
| JP | 05-61632 | | 3/1993 |
| JP | 2001154803 A | * 6/2001 | G06F 3/033 |
| JP | 2005-108041 | | 4/2005 |
| KR | 1020060022114 | | 3/2006 |
| WO | WO 99/54807 | | 10/1999 |

OTHER PUBLICATIONS

Office Action dated Aug. 26, 2016 by the United States Patent and Trademark Office in related U.S. Appl. No. 14/737,061.
Office Action dated Mar. 24, 2016 by the United States Patent and Trademark Office in related U.S. Appl. No. 14/737,061.
Communication dated Dec. 22, 2017, issued by the United States Patent and Trademark Office in counterpart U.S. Appl. No. 15/793,536.

* cited by examiner

METHOD AND MOBILE COMMUNICATION TERMINAL FOR CHANGING A CONFIGURATION OF A SCREEN DISPLAYING FUNCTION ITEMS

PRIORITY

This application claims priority under 35 U.S.C. § 119(a) to a Korean Patent Application filed in the Korean Intellectual Property Office on Aug. 8, 2006 and assigned Serial No. 2006-74757, the disclosure of which is incorporated herein by reference.

BACKGROUND OF THE INVENTION

1. Field of the Invention

The present invention generally relates to a mobile communication terminal, and more particularly to a method and mobile communication terminal for changing the configuration of a screen displaying function items.

2. Description of the Related Art

In conventional mobile communication terminals, screens for function items are constructed in the same size and form, as shown in FIG. 1, and have a structure for displaying icons and titles of the function items. On a screen displaying the function items divided in a uniform size, as shown in FIG. 1, an associated function icon is shaded when an indicator is used for a user's selection. The user can select a current desired function item by moving the associated indicator.

There is a problem in that display visibility is low since movement between items and a current position is indicated only by shading of a screen displaying function items of a conventional mobile communication terminal.

As user demands have become more diverse, mobile communication terminals now support a variety of functions, such as a menu edit function and the like, so additional functions can be efficiently utilized in various methods while considering various desires of the users. These methods should be able to satisfy desires of users and preferentially consider convenience for users.

However, since specific function items may be conventionally displayed only in a similar size and shape, it is difficult for users to differentially display high-preference items. For example, icons or list items indicating a buddy group and a family group in a phonebook are very similar to each other in size and shape, and differentiation between them, other than changing only a sequence of the icons or lists, is not available.

SUMMARY OF THE INVENTION

As described above, users may simply change only a sequence of function items even when they desire to differentiate specific function items from others. For this reason, there is a problem in that display visibility of the function items is low.

The present invention addresses at least the above problems and/or disadvantages and provides at least the advantages described below. Accordingly, an aspect of the present invention is to provide a method and mobile communication terminal for changing a configuration of a screen displaying function items that can increase display visibility of the function items of the mobile communication terminal and can easily and quickly access the function items.

In accordance with an aspect of the present invention, there is provided a method for changing a configuration of a screen displaying function items of a mobile communication terminal, including activating a block onto which an indicator is moved in a screen displaying at least one block in which detailed items are provided for functions of the mobile communication terminal; determining whether an edit request is input from a user in a state in which the block is activated; and reconfiguring the screen by changing at least one of size and position of the activated block in response to a user setting when the edit request is input.

In accordance with another aspect of the present invention, there is provided a mobile communication terminal for changing a configuration of a screen displaying function items, the terminal including a user interface provided with a zoom-in key and a zoom-out key for outputting a key input signal mapped to a key input from a user; a controller for controlling a screen to display at least one block in which detailed items are provided for functions of the mobile communication terminal when the user selects a specific function, and for reconfiguring the screen by changing at least one of size and position of a block of the at least one block on which an indicator is positioned in response to a key input signal mapped to an edit request from the user when the indicator is positioned on the block; and a display for displaying the screen of the at least one block and the reconfigured screen under control of the controller.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

Figure 1:
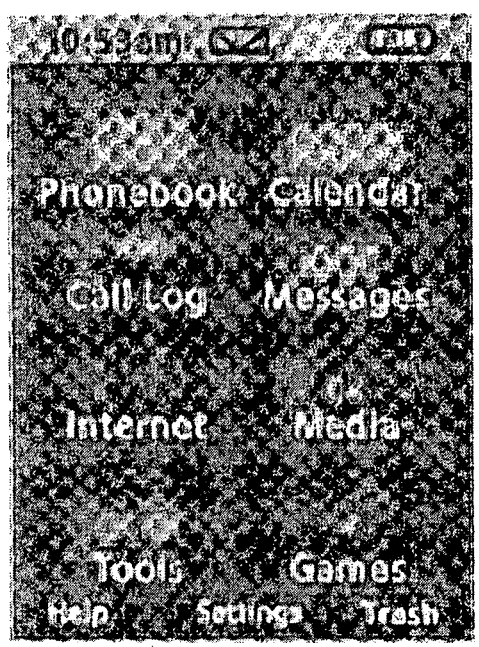
FIG. 1 illustrates an example of a screen for function items of a conventional mobile communication terminal.

Preferred embodiments of the present invention will be described below with reference to the accompanying drawings. In the drawings, the same or similar elements are denoted by the same reference numerals even though they are depicted in different drawings. Descriptions of well-known functions and constructions are omitted for clarity and conciseness.

Preferred embodiments of the present invention can implement a function for configuring a screen reflecting user preference when formlets are displayed to indicate function items of a mobile communication terminal. In preferred embodiments of the present invention, the size, position and shape of a formlet on which an indicator is positioned are changed by user settings in a state in which multiple formlets are displayed, thereby increasing accessibility to a formlet of high preference of a user, and also increasing display visibility.

Formlets used in the present invention will now be briefly described.

A formlet is a work block for enabling interaction with a storage object. For example, a phonebook function, a camera function, or the like, can be implemented with one formlet. This formlet is one component of a zooming User Interface (UI) and is a function unit provided to the user for a specific purpose (for example, a call log formlet or a phonebook formlet). These formlets can be displayed on one screen. When a user zooms in on a desired formlet, the user can view detailed items of a function mapped to the formlet. That is, the work block is a block of detailed items for a function of the mobile communication terminal. In a screen displaying work blocks, a function for quickly accessing a work block of high interest to the user is desired. Therefore, a need exists for a method which can differentially display a work block of high interest to the user.

Figure 2:
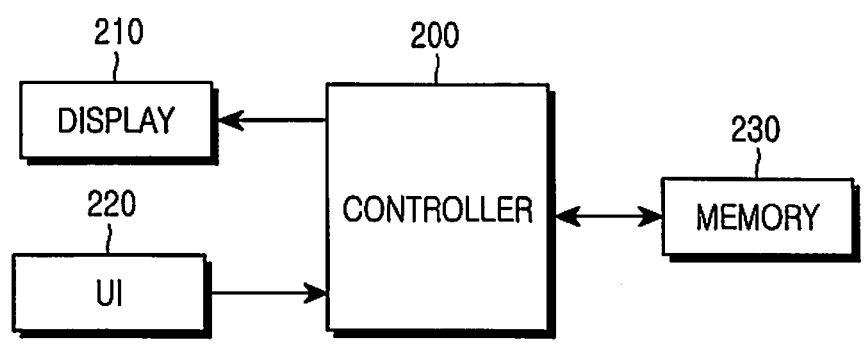
FIG. 2 is a block diagram of a mobile communication terminal according to the present invention.

FIG. 2 shows a mobile communication terminal according to the present invention for providing a personalized formlet according to need. The formlet is referred to herein as the work block.

Referring to FIG. 2, a controller 200 controls the overall operation of the mobile communication terminal. In particular, the controller 200 changes the size and position of a specific work block in response to user settings in a screen displaying at least one work block, and controls a display 210 to output a change result. Also, the color and shape of the specific work block can be changed in accordance with the present invention.

Specifically, the controller 200 controls the display 210 to display a function for editing a work block selected by the user from a screen displaying multiple work blocks in accordance with the present invention. That is, the controller 200 allows the user to easily change the size, position, color and shape of a work block by providing the edit function for the selected work block. In the present invention, a key for editing a work block can be assigned with a function key for performing other existing functions. Alternatively, the edit function for a work block can be provided by displaying an edit option menu on the screen. As described above, the edit function can be provided in various methods using a specific key or a menu on the screen.

Using this edit function, the user can set the selected work block to a desired size and can move the work block to a desired position. When color and shape change option menus are selected and various color and shape lists are displayed, the user can change the color and shape of the work block by selecting a desired color and shape. Since a high-interest work block can be arranged in a desired size and position, the user can easily access and move a desired work block. In the present invention, a work block of high interest to the user can be differentially displayed, without modification of the work block, according to size change since work blocks are created in a vector form.

On the other hand, in the present invention, a Graphic Input Device (GID) cursor is provided to select an associated work block from a screen displaying work blocks. The GID cursor can be an indicator for selecting a work block displayed on the display 210 and can have a cross shape like a mouse cursor. The GID cursor operates based on a rollover function. In the present invention, the rollover function can change the color of the edge of an associated part or can indicate the associated part by shade, when the GID cursor is placed on or passes through a specific area displayed on the display 210, such as a work block, an screen, a button, or the like. When the user moves the GID cursor on the screen, the controller 200 can change and display the color of a work block in a moved position.

On the other hand, various work blocks displayed on one screen are executed in the following method. The user selects a desired work block using a zoom-in function. When a zoom-in request is input, the controller 200 controls an operation for enlarging the work block to display the enlarged work block. On the displayed enlarged work block, detailed items of a selected function are displayed. Various types of information regarding the detailed items can be provided. For example, when a user zooms in on a "phonebook" work block, information regarding functions of a phonebook list and the like can be displayed, or sub-menus of a phone number search menu, a recent call list menu, and the like, can be displayed.

When the edit function is not selected although a specific work block is activated as described above, the work block itself is enlarged and displayed in response to the zoom-in input, so detailed items of the work block can be displayed to the user. In another example of the present invention, the zoom-in or zoom-out input is used to adjust the size of a specific work block after the edit function is selected in a state in which the specific work block is activated. After the edit function is selected, a direction key input can be used to move the work block and determine a position of the work block. When the user selects color and shape change option menus, a palette and shape tool are displayed on the screen, so the work block can be changed to the color and shape desired by the user.

Under control of the controller 200, the display 210 can receive and output display data mapped to key input data from a UI 220 or can display an operating state of the terminal and a plurality of pieces of information in the form of icons and characters. Under the control of the controller 200, the display 210 allows the user to visually detect an operating state in which a function is set or started.

In addition, in response to the zoom-in or zoom-out input by the user, the display 210 can enlarge or reduce a work block so other functions can be immediately executed without a hierarchical movement between menus on a screen displaying specific work blocks. In particular, the display 210 to which the present invention is applied displays an edit menu mapped to selection when the user selects the edit function. When the display 210 is constructed with a touch screen, the display 210 can provide the controller 200 with a control signal related to a work block movement and selection by the user like the UI 220.

The UI 220 can be provided with number keys and function keys and can provide the controller 200 with input data mapped to a key selected by the user. In accordance with the present invention, the UI 220 can include a zoom-in or zoom-out key for enlarging or reducing work blocks in which detailed items for various functions are provided. This zoom-in or zoom-out key can be additionally provided on the UI 220 or can be implemented with a function key for performing other existing functions. Alternatively, the zoom-in or zoom-out key can be implemented with a combination of keys mapped in advance.

The memory 230 can be constructed with a Random Access Memory (RAM) and a Read-Only Memory (ROM) for storing a plurality of programs, data, and the like. Other configurations of memory 230 may alternatively be used according to the desires of the user. In accordance with the present invention, the memory 230 can store various work blocks to be displayed on a screen and their information. Moreover, the memory 230 can store information generated and updated by the user for high-interest work blocks.

Figure 3:
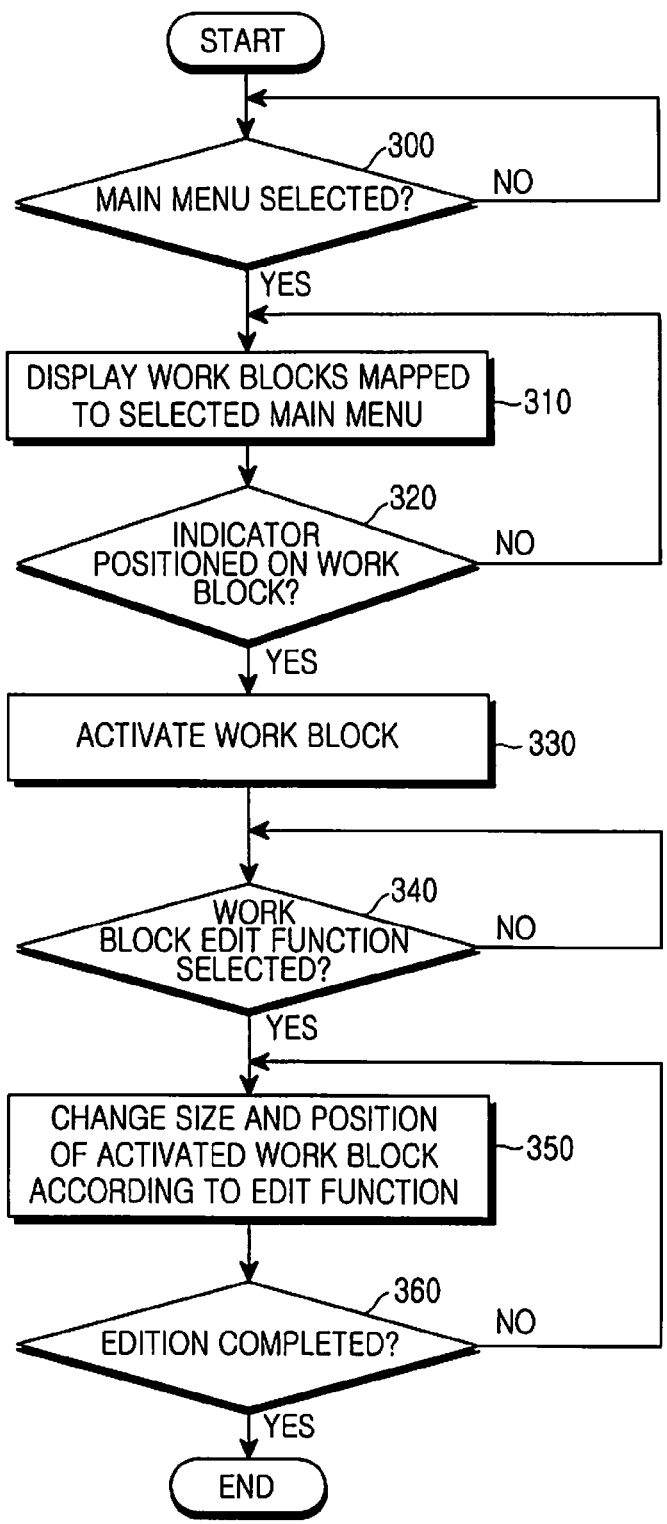
FIG. 3 is an operation flowchart illustrating a method for changing the configuration of work blocks in accordance with the present invention.
Figure 4:
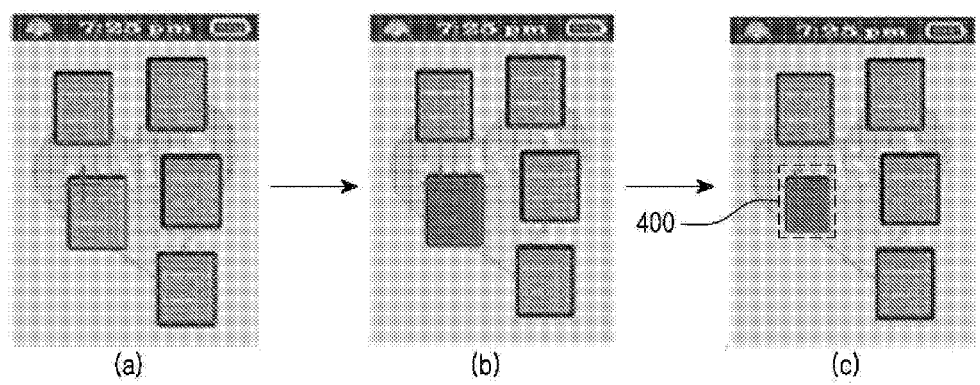
FIG. 4 illustrates an example of a screen displaying a reduced size work block in accordance with the present invention.
Figure 5:
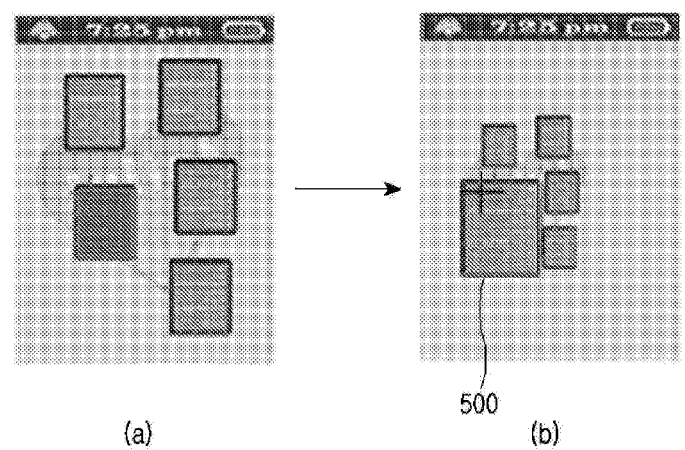
FIG. 5 illustrates an example of a screen displaying an enlarged size work block in accordance with the present invention.

Certain examples to which the present invention is applied will now be described with reference to FIGS. 3 to 5. FIG. 3 shows an operation for changing a configuration of a screen displaying work blocks in a mobile communication terminal with the above-described structure in accordance with the present invention, and FIGS. 4 and 5 show examples of screens according to operations shown in FIG. 3. FIG. 3 relates to an example of displaying work blocks mapped to a main menu when the main menu is selected.

Referring to FIG. 3, the controller 200 determines whether the user selects the main menu in step 300. If the main menu is selected, the controller 200 proceeds to step 310 to display a plurality of work blocks mapped to the selected main menu. For example, when the main menu is selected, various work blocks such as a "phonebook" work block, a "message" work block, a "camera" work block, and the like can be displayed on one screen, as shown in diagram (a) of FIG. 4. An indicator, such as a GID cursor for selecting a work block, overlaps with the work blocks on one screen.

Then, the controller 200 determines whether the indicator is positioned on one work block according to user input in step 320. If the indicator is positioned on one work block, the controller 200 activates the associated work block in step 330. When a movement between work blocks is made according to user input, the controller 200 allows the user to view the activated work block by changing the color of the edge of the work block on which the indicator is currently being positioned or indicating the work block by shade along with the moved indicator.

To select a desired work block from the screen, as shown in diagram (a) of FIG. 4, the user moves the indicator onto the desired work block. When the indicator is positioned on the desired work block in a state in which the work blocks are displayed, as shown in diagram (a) of FIG. 4, the color of the whole function block on which the indicator is positioned is varied, as shown in diagram (b) of FIG. 4. In a state in which the associated work block is activated, the controller 200 proceeds to step 340 to determine whether the edit function is selected for the work block on which the indicator is positioned.

If the edit function is selected, the controller 200 proceeds to step 350 to change the size and position of the activated work block according to the edit function selected by the user, and to display the work block in the changed size and position. The user can also change the color and shape of the activated work block using the edit function. Then, the controller 200 determines whether the editing is completed in step 360. Until the editing is completed, the work block is edited according to user input. Through the above-described edit function, a work block of high interest to the user can be differentially displayed which is distinguished from other work blocks. As visibility of a work block is improved, the user can quickly access the work block.

On the other hand, the user can edit the associated work block in many methods in a state in which the associated work block is activated with reference to FIG. 3. The edit method will be described with reference to FIGS. 4 and 5. Diagram (b) of FIG. 4 and diagram (a) of FIG. 5 show examples of indicating an activation state by varying the color of a specific work block on which the indicator is positioned, diagram (c) of FIG. 4 shows an example of reducing the size of the activated work block, and diagram (b) of FIG. 5 shows an example of enlarging the size of the activated work block.

Diagram (c) of FIG. 4 shows an example in which the specific work block of diagram (b) of FIG. 4 is reduced to a smaller size than the original size and is displayed in a smaller size than other work blocks as indicated by reference numeral 400 when a zoom-out request is input after the user presses an edit key or selects an edit menu in a state in which the specific work block is activated. Similarly, diagram (b) of FIG. 5 shows an example in which the activated work block is displayed in a larger size as indicated by reference numeral 500 when the user inputs a zoom-in request in a state in which the activated work block of diagram (a) of FIG. 5 is displayed.

Using the zoom-out function, the user can reduce low-interest work blocks to a size smaller than the original size. Using the zoom-in function, the user can enlarge a high-interest work block to a larger size. With reference to FIGS. 4 and 5, an example of displaying work blocks mapped to a main menu has been described. For example, when a phonebook function is selected, work blocks for buddy and family groups and the like can be displayed. As described above, frequently used sub-functions mapped to specific functions can be displayed with work blocks.

As is apparent from the above description, the present invention can reconfigure a screen displaying a plurality of work blocks using zoom-in and zoom-out functions while considering interest of a user. Moreover, the present invention can differentially display a work block of high interest to the user without modification of the work block according to size change since work blocks are created in a vector form.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:
1. An electronic device comprising:
a memory storing instructions; and
a processor configured to execute the instructions to:
control to provide blocks associated with applications on a screen of the electronic device, a size or a shape of each of the blocks being changeable based on a corresponding input, and one of the blocks and another of the blocks being provided in a first shape;
based on an input on the one of the blocks, control to enter an edit mode by providing an edit menu object for providing a first option for changing a shape of the one of the blocks and a second option for changing a size of the one of the blocks;
during the edit mode:
based on an input on the first option, control to provide a list of shapes;
in response to a selection of a shape among the list of shapes:
control to change the first shape of the one of the blocks to a second shape different from the first shape; and
control to provide the edit menu object with the one of the blocks, of which the first shape is changed to the second shape; and
in response to an input on the second option:
control to change a first size of the one of the blocks, of which the first shape is changed to the second shape, to a second size larger than the first size; and
control to provide the edit menu object with the one of the blocks, of which the first shape is changed to the second shape and the first size is changed to the second size; and control to store information regarding the second shape and the second size of the one of the blocks, of which the first shape is changed to the second shape and the first size is changed to the second size, in the memory.

2. The electronic device of claim 1, wherein the one of the blocks corresponds to a phone book application of the electronic device.

3. The electronic device of claim 1, wherein, when the one of the blocks is enlarged, information regarding a phone book list that is stored in the memory is displayed within the enlarged one of the blocks.

4. The electronic device of claim 1, wherein, when the one of the blocks is enlarged, items are displayed within the enlarged one of the blocks, the items corresponding to contacts on a phone book list that is stored in the memory.

5. A non-transitory computer-readable storage medium storing instructions executable by a processor of an electronic device to cause the processor to:
   control to provide blocks associated with applications on a screen of the electronic device, a size or a shape of each of the blocks being changeable based on a corresponding input, and one of the blocks and another of the blocks being provided in a first shape;
   based on an input on the one of the blocks, control to enter an edit mode by providing an edit menu object for providing a first option for changing a shape of the one of the blocks and a second option for changing a size of the one of the blocks;
   during the edit mode:
      based on an input on the first option, control to provide a list of shapes;
      in response to a selection of a shape among the list of shapes:
         control to change the first shape of the one of the blocks to a second shape different from the first shape; and
         control to provide the edit menu object with the one of the blocks, of which the first shape is changed to the second shape; and
      in response to an input on the second option:
         control to change a first size of the one of the blocks, of which the first shape is changed to the second shape, to a second size larger than the first size; and
         control to provide the edit menu object with the one of the blocks, of which the first shape is changed to the second shape and the first size is changed to the second size; and
   based on exiting the edit mode, control to store information regarding the second shape and the second size of the one of the blocks, of which the first shape is changed to the second shape and the first size is changed to the second size, in a memory.

6. The non-transitory computer-readable storage medium of claim 5, wherein the one of the blocks corresponds to a phone book application of the electronic device.

7. The non-transitory computer-readable storage medium of claim 5, wherein, when the one of the blocks is enlarged, information regarding a phone book list that is stored in the memory is displayed within the enlarged one of the blocks.

8. The non-transitory computer-readable storage medium of claim 5, wherein, when the one of the blocks is enlarged, items are displayed within the enlarged one of the blocks, the items corresponding to contacts on a phone book list that is stored in the memory.

9. A method of providing a user interface in an electronic device, the method comprising:
   controlling to provide blocks associated with applications on a screen of the electronic device, a size or a shape of each of the blocks being changeable based on a corresponding input, and one of the blocks and another of the blocks being provided in a first shape;
   based on an input on the one of the blocks, controlling to enter an edit mode by providing an edit menu object for providing a first option for changing a shape of the one of the blocks and a second option for changing a size of the one of the blocks;
   during the edit mode;
      based on an input on the first option, control to provide a list of shapes;
      in response to a selection of a shape among the list of shapes:
         controlling to change the first shape of the one of the blocks to a second shape different from the first shape; and
         controlling to provide the edit menu object with the one of the blocks, of which the first shape is changed to the second shape; and
      in response to an input on the second option:
         controlling to change a first size of the one of the blocks, of which the first shape is changed to the second shape, to a second size larger than the first size; and
         controlling to provide the edit menu object with the one of the blocks, of which the first shape is changed to the second shape and the first size is changed to the second size; and
   based on exiting the edit mode, controlling to store information regarding the second shape and the second size of the one of the blocks, of which the first shape is changed to the second shape and the first size is changed to the second size, in a memory.

10. The method of claim 9, wherein the one of the blocks corresponds to a phone book application of the electronic device.

11. The method of claim 9, wherein, when the one of the blocks is enlarged, information regarding a phone book list that is stored in the memory is displayed within the enlarged one of the blocks.

12. The method of claim 9, wherein, when the one of the blocks is enlarged, items are displayed within the enlarged one of the blocks, the items corresponding to contacts on a phone book list that is stored in the memory.

* * * * *